US010055977B2

(12) United States Patent
Wang et al.

(10) Patent No.: US 10,055,977 B2
(45) Date of Patent: Aug. 21, 2018

(54) WEARABLE CONTROL DEVICE, CONTROL SYSTEM AND METHOD FOR CONTROLLING CONTROLLED APPLIANCE

(71) Applicant: Honeywell International Inc., Morristown, NJ (US)

(72) Inventors: Yi Wang, Shanghai (CN); Jie Yu, Shanghai (CN); Xiaoguang Zhao, Shanghai (CN); Rongbao Nie, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/337,135

(22) Filed: Oct. 28, 2016

(65) Prior Publication Data

US 2017/0124857 A1 May 4, 2017

(30) Foreign Application Priority Data

Oct. 30, 2015 (CN) .......................... 2015 1 0720357

(51) Int. Cl.
*G08C 17/02* (2006.01)
*G08B 7/06* (2006.01)
*H04L 12/46* (2006.01)
*H04L 12/28* (2006.01)
*H04B 1/3827* (2015.01)
*G08B 25/00* (2006.01)
*H04W 4/80* (2018.01)

(52) U.S. Cl.
CPC ............... *G08C 17/02* (2013.01); *G08B 7/06* (2013.01); *H04B 1/385* (2013.01); *H04L 12/4625* (2013.01); *G08B 25/008* (2013.01); *G08C 2201/30* (2013.01); *G08C 2201/61* (2013.01); *H04B 2001/3855* (2013.01); *H04B 2001/3861* (2013.01); *H04B 2001/3866* (2013.01); *H04L 2012/2841* (2013.01); *H04W 4/80* (2018.02)

(58) Field of Classification Search
CPC .......... G06F 21/32; G06F 21/35; G06F 21/34; G06F 19/34; G06F 21/83; G06F 21/88; G06F 2203/0338; G06F 3/03547
USPC ....................................................... 340/5.38
See application file for complete search history.

(56) References Cited

U.S. PATENT DOCUMENTS 9,596,561 B2 * 3/2017 Heo ...................... H04W 4/008
9,766,092 B2 * 9/2017 Chung ................... G01C 25/00
2015/0242608 A1 * 8/2015 Kim ...................... G06F 1/3231
726/19

(Continued)

Primary Examiner — Mark Blouin
(74) Attorney, Agent, or Firm — Husch Blackwell LLP

(57) ABSTRACT

The present invention provides a wearable control device for controlling a controlled appliance, wherein the wearable control device comprises a biological information input unit for receiving input biological information, a processing unit for determining whether the input biological information is registered biological information and generating a control signal based on said input biological information only when the input biological information is the registered biological information, and a first communication unit for communicating the control signal to the controlled appliance and for receiving a response signal from the controlled appliance. The present invention further provides a control system for controlling the controlled appliance and a corresponding control method.

17 Claims, 3 Drawing Sheets

(56) References Cited

U.S. PATENT DOCUMENTS

| | | | |
|---|---|---|---|
| 2015/0264028 A1* | 9/2015 | Kim | H04L 43/08 |
| | | | 726/3 |
| 2016/0142402 A1* | 5/2016 | Kim | H04L 63/08 |
| | | | 726/4 |
| 2016/0173318 A1* | 6/2016 | Ha | H04W 4/08 |
| | | | 709/223 |
| 2016/0364624 A1* | 12/2016 | Kim | G06K 9/3241 |
| 2017/0011210 A1* | 1/2017 | Cheong | H04W 12/06 |
| 2017/0048224 A1* | 2/2017 | Teraoka | H04L 63/08 |
| 2017/0111340 A1* | 4/2017 | Gomi | H04L 63/08 |
| 2017/0196456 A1* | 7/2017 | Hwang | A61B 5/0024 |
| 2017/0280018 A1* | 9/2017 | Morita | H04N 1/442 |

* cited by examiner

WEARABLE CONTROL DEVICE, CONTROL SYSTEM AND METHOD FOR CONTROLLING CONTROLLED APPLIANCE

TECHNICAL FIELD

The present invention relates to a wearable electronic device and, in particular, to wearable control technology for controlling a controlled appliance.

BACKGROUND OF THE INVENTION

A smart home system involves such components as security protection, light control, curtain control, gas valve control, an information household appliance, scene linkage, floor heating, and healthcare and epidemic prevention. A smart home can be controlled by a separate controller. A user may also control the smart home through a remote end electronic control system of an electronic device.

In the present way of controlling the smart home by a remote controller, the remote controller can be operated by anyone so there is still room for improvement as far as safety is concerned.

SUMMARY OF THE INVENTION

The present invention provides a wearable control device for controlling a controlled appliance, which improves the way of controlling a smart home in many aspects. According to an example of the present invention, the wearable control device for controlling the controlled appliance is provided, wherein the wearable control device comprises a biological information input unit for receiving input biological information, a processing unit for determining whether the input biological information is registered biological information and generating a control signal based on said input biological information only when the input biological information is the registered biological information, and a first communication unit for communicating the control signal to the controlled appliance and receiving a response signal from the controlled appliance.

Alternatively, said wearable control device further comprises a presetting unit coupled to the biological information input unit and the processing unit for setting a correspondence between the input biological information received through the biological information input unit and the control signal when the wearable control device is in a preset mode so that the processing unit can generate the control signal based on said correspondence.

Alternatively, said wearable control device further comprises a second communication unit for enabling communication between the wearable control device and an external electronic device, wherein said external electronic device includes a wearable device control unit, and wherein in the preset mode, the presetting unit sends a registration signal requesting registration of the input biological information to the wearable device control unit through the second communication unit and, after obtaining a confirmation from the wearable device control unit, sets the input biological information as the registered biological information and sets the correspondence between the input biological information received through the biological information input unit and the control signal.

Alternatively, the external electronic device is one or more of a cell phone, a tablet PC, a laptop, and a desktop computer.

Alternatively, said wearable control device further comprises a warning unit for issuing a warning signal when the response signal from the controlled appliance is an alarm signal.

According to another example of the present invention, a control system for controlling a controlled appliance is provided, wherein the control system comprises a wearable control device and an external electronic device. Said wearable control device comprises a biological information input unit for receiving input biological information, a processing unit for determining whether the input biological information is registered biological information and generating a control signal based on said input biological information only when the input biological information is the registered biological information, a first communication unit for communicating the control signal to the controlled appliance and receiving a response signal from the controlled appliance, and a second communication unit. The external electronic device includes a wearable device control unit that communicates with the wearable control device through the second communication unit. When the wearable control device is in a preset mode, the wearable control device sends, through the second communication unit, a registration signal requesting registration of the input biological information input through the biological information input unit to the wearable device control unit and sets the input biological information as the registered biological information after obtaining a confirmation from the wearable device control unit.

Alternatively, the control system for the controlled appliance further comprises a presetting unit that sets a correspondence between the input biological information and the control signal in the preset mode when the input biological information received through the biological information input unit has been set as the registered biological information so that the processing unit generates the control signal according to said correspondence.

Alternatively, in the control system for the controlled appliance, the external electronic device is one or more of a cell phone, a tablet PC, a laptop, and a desktop computer.

Alternatively, in the control system for the controlled appliance, said wearable control device further comprises a warning unit for issuing a warning signal when the response signal from the controlled appliance is an alarm signal.

According to another example of the present invention, a method for controlling a controlled appliance is provided and applied to a wearable electronic device that comprises a biological information input unit. Said method comprises receiving first biological information input by a user through said biological information input unit, determining whether the first biological information is registered biological information, generating a control signal based on said first biological information only when the first biological information is the registered biological information, communicating the control signal to the controlled appliance, and when there is a response signal from the controlled appliance, receiving said response signal and processing accordingly by the wearable electronic device.

Alternatively, said method for controlling the controlled appliance further comprises setting a correspondence between the first biological information input through the biological information input unit and the control signal when the wearable electronic device is in a preset mode and generating the control signal based on said first biological information and said correspondence.

Alternatively, said method for controlling the controlled appliance further comprises, in the preset mode, sending a registration signal requesting registration of the first biological information to an external electronic device by the wearable electronic device and setting the first biological information as the registered biological information and the correspondence between the first biological information and the control signal after obtaining a confirmation from the external electronic device.

Alternatively, said method for controlling the controlled appliance further comprises issuing a warning signal by said wearable electronic device when the response signal from the controlled appliance is an alarm signal.

In the above examples, the input or first biological information may be a fingerprint.

The examples provided by the present invention can facilitate the user directly controlling various appliances of the smart home through the wearable control device without a need to find a controller. Moreover, in addition to convenience, the input or first biological information, such as the fingerprint, can be registered only under permission of an administrator of the wearable control device, thus preventing an unauthorized user from controlling the smart home.

DETAILED DESCRIPTION OF THE INVENTION

Figure 1:
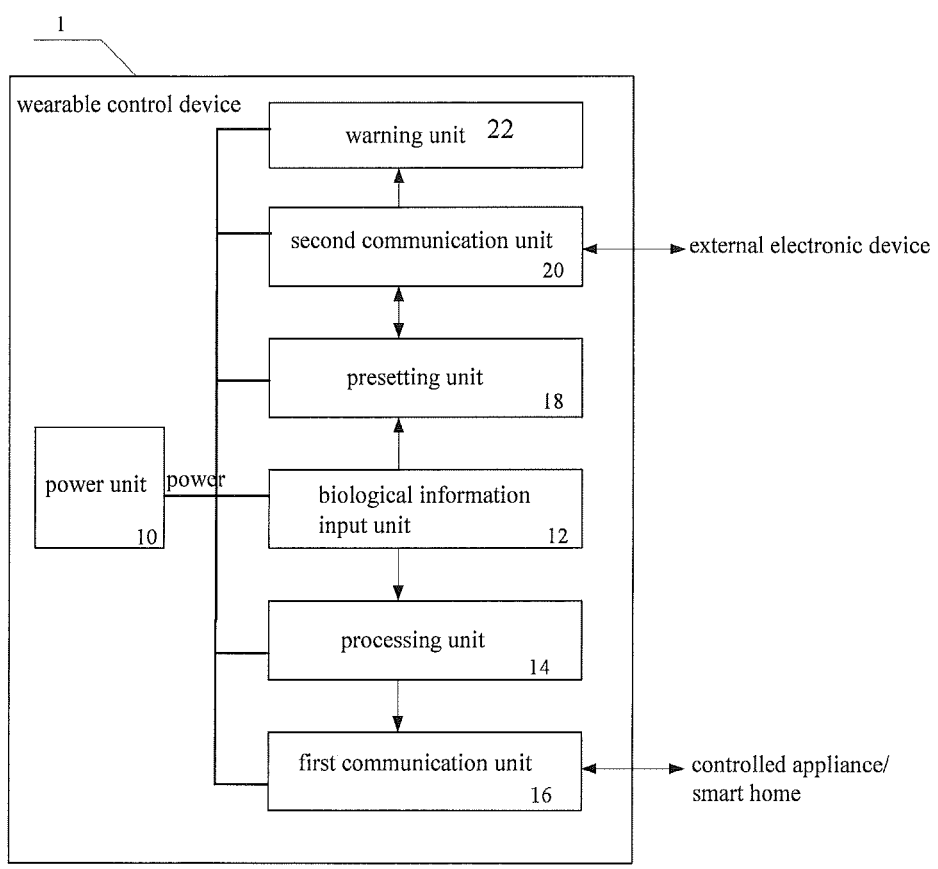
FIG. 1 is a schematic drawing of a structure of a wearable control device for controlling a controlled appliance according to one embodiment of the present invention.

Different examples of the present invention are described below with reference to the drawings, wherein the same reference numerals indicate the same elements. The embodiments described in the text below will facilitate those skilled in the art to have a thorough understanding of the invention, but they only intend to illustrate instead of limiting the invention. The elements, components, modules, devices, and means in the figures are not necessarily drawn to scale, but they schematically show the relative relationship among said elements, components, modules, devices, and means.

A wearable device is a portable device that can be directly worn by a user or be integrated into clothes or accessories of the user. The wearable device that uses a wrist as a support is taken as an example in the text below to illustrate the present invention, but it does not mean to exclude wearable devices that use a head as the support, such as glasses, and other wearable devices, such as smart clothes. In practical application, the technical solution proposed by the present invention can be applied to glasses, necklaces, armlets, etc. In addition, the wearable device that uses the wrist as the support is specifically exemplified by a bracelet or a wristwatch having a display screen.

In the following descriptions, a wearable control device according to the example of the present invention is used for controlling a smart home. That is, controlled appliances controlled by said wearable control device are various appliances of the smart home. As those skilled in the art may understand, the smart home may include many components, such as security protection, light control, curtain control, gas valve control, an information household appliance, scene linkage, floor heating, and healthcare and epidemic prevention, but the appliances specifically involved in different smart home systems are not completely the same because of different users so only several appliances are involved in this text as examples.

FIG. 1 is a schematic drawing of a structure of a wearable control device for controlling a controlled appliance according to one embodiment of the present invention. As an example, the wearable control device 1 as shown in FIG. 1 is a wearable device using a wrist as support. The wearable control device 1 comprises a power unit 10, a biological information input unit 12, a processing unit 14, and a first communication unit 16. Alternatively, the wearable control device 1 may comprise a presetting unit 18, and second communication unit 20, and a warning unit 22.

The power unit 10 supplies power to each of the units and components of the wearable control device 1, and it can store power in any form, for example, a battery that can store the power and output the power to each of the units and the components of the wearable control device 1, wherein said battery, for example, could be a rechargeable battery.

The biological information input unit 12 receives biological information input by a user. In the present invention, the biological information may be various biological information related to the user, such as fingerprint information, facial information, voice information, iris information, etc. When the biological information is the fingerprint information, the biological information input unit 12 is, for example, a fingerprint sensor; when the biological information is the facial information, the biological information input unit 12 is, for example, a camera; when the biological information is the voice information, the biological information input unit 12 is a voice input unit, for example, a microphone, etc. In all examples herein, the fingerprint information is used as the biological information. In the descriptions below, the biological information input unit 12 sometimes refers to the fingerprint sensor 12 according to the context.

The processing unit 14 determines whether the biological information received by the biological information input unit 12 is registered biological information and generates a control signal based on the biological information received by the biological information input unit 12 only when said biological information received by the biological information input unit 12 is the registered biological information. For example, the processing unit 14 first determines whether a user fingerprint input through the fingerprint sensor 12 is a registered fingerprint. If yes, then it further generates the control signal based on the user fingerprint input through the fingerprint sensor 12. According to one example of the present invention, the processing unit 14 compares the user fingerprint input through the fingerprint sensor 12 to the registered fingerprint and generates the control signal according to a correspondence between the registered fingerprint and the control signal.

The first communication unit 16 sends the control signal generated by the processing unit 14 to the controlled appliance so as to control said controlled appliance. The first communication unit 16 also receives signals from the controlled appliance. As mentioned previously, the exemplified wearable control device 1 can be used to control a smart home system so, alternatively, the first communication unit 16 sends the control signal to a control center of the smart home system, and the controlled appliance is controlled by the control signal.

The correspondence between the registered fingerprint and the control signal is pre-set. For example, it is pre-set that the registered fingerprint of an index finger of a right hand of user A is associated with light control. Accordingly, if what has been input is the user fingerprint of the right hand index finger of user A, then control of a light is enabled. The control of the light includes turning on the light if the user fingerprint of the right hand index finger of user A is received while the light is off and turning off the light if the user fingerprint of the right hand index finger of user A is received while the light is on. Further, if two inputs of the user fingerprint of the right hand index finger of user A are received successively while the light is on, then such input indicates that brightness of the light will be adjusted. As another example, it is pre-set that the registered fingerprint of the index finger of a left hand of user A is associated with curtain control. Accordingly, if what has been input is the user fingerprint of the left hand index finger of user A, then the control of a curtain is enabled. Specifically, it can be set to close the curtain if the user fingerprint of the left hand index finger of user A is received while the curtain is open and to open the curtain if the user fingerprint of the left hand index finger of user A is received while the curtain is closed. The correspondence between the registered fingerprint and the control signal can be set in various different forms, but it is not limited to that described above.

According to an example of the present invention, the wearable control device 1 comprises the presetting unit 18 coupled to the biological information input unit 12 and the processing unit 14. When the wearable control device 1 is in a preset mode, the presetting unit 18 sets the correspondence between the biological information input through the biological information input unit 12 and the control signal. For example, in the preset mode, the wearable control device 1 first determines whether to set the user fingerprint received through the biological information input unit 12 as the registered fingerprint, and when it determines to set the user fingerprint received through the biological information input unit 12 as the registered fingerprint, it further sets the correspondence between the registered fingerprint and the control signal. Such a determination of whether to set the user fingerprint received through the biological information input unit 12 as the registered fingerprint is carried out based on a safety principle. In an example of the present invention, becoming the registered fingerprint requires approval from an administrating user, wherein the administrating user refers to the user having a right to determine whether to register a new fingerprint as the registered fingerprint and could also be referred to as an administrator of the wearable control device 1. Taking a family as an example, when there are three family members (user A, user B, and user C), user A is the administrating user, and the other two members can input their fingerprints through the wearable control device 1 for registration, but user A determines whether the registration can be successful. For example, in a registration mode, user B first inputs his/her fingerprint through the biological information input unit 12, and if user A agrees to accept him/her as a registered user, then user A inputs his/her fingerprint of his/her right hand thumb through the biological information input unit 12 to indicate the approval.

According to another example of the present invention, the wearable control device 1 comprises the second communication unit 20. The second communication unit 20 enables communication between the wearable control device 1 with an external electronic device. The external electronic device may comprise a wearable device control unit. In the preset mode, the presetting unit 18 sends a registration signal of a user requesting registration of the biological information received by the biological information input unit 12 to the wearable device control unit through the second communication unit 20 and, after obtaining a confirmation from the wearable device control unit, sets the biological information received by the biological information input unit 12 as the registered biological information and further sets the correspondence between the registered biological information and the control signal. The external electronic device is, for example, one or more of a cell phone, a tablet PC, and a laptop of the administrating user of the wearable control device 1. For example, in the preset mode, user B first inputs his/her fingerprint through the biological information input unit 12, and the second communication unit 20 of the wearable control device 1 sends the registration signal of user B requesting registration to an electronic device, e.g. a cell phone, of user A. If user A agrees, then user A may send a confirmation signal of approval to the second communication unit 20, wherein said confirmation signal of approval is, for example, a set of confirmation codes.

According to still another example of the present invention, the wearable control device 1 further comprises the warning unit 22. The warning unit 22 issues a warning signal when a response signal received from the controlled appliance is an alarm signal. The warning unit 22 warns, for example, by vibration, by a display visible to the user, by a voice audible to the user, or by a combination of any of said ways. Generally speaking, a smart home includes an armed mode and a disarmed mode. In the armed mode, if someone intrudes into an environment where the smart home is located, then the alarm signal of the smart home system is communicated through the first communication unit 16 to the wearable control device 1, and the warning unit 22 then issues the alarm signal. The meaning of the armed mode and the disarmed mode is just the same as that commonly understood by those skilled in the art. With respect to the smart home system, when the user leaves home, the smart home system is put into an armed state, and when someone intrudes, the smart home system will give an alarm; a disarming system is to remove arming when the user returns home.

According to an example of the present invention, the wearable control device 1 comprises a display unit, a key for selecting controlled scenes, and a key for enabling setting of arming and disarming. Controlling scenes refers to controlling different appliances in the smart home system, for instance, scene 1 is controlling the light, scene 2 is controlling an air conditioner, scene 3 is controlling the curtain, scene 4 is controlling a gas valve, etc. When the user selects one of the scenes, the display unit of the wearable control device 1 will display that scene that is currently selected. If it is not the scene that the user wants to select, then the user can select a desired one of the scenes through the key for selecting controlled scenes. Referring to the descriptions about the correspondence between the registered fingerprint and the control signal as given in the above text, the correspondence between the registered fingerprint and the control signal herein can also involve the scenes. For example, in scene 1, the user fingerprint of the right hand index finger of user A is associated with the light control, and in scene 2, the user fingerprint of the right hand index finger of user A is to control the air conditioner.

In addition, the preset mode can be entered in different ways. For example, the preset mode is entered by selecting in a main menu (if any) of the wearable control device 1, or it is entered through a mode selecting key disposed on the wearable control device 1, for example, while the mode selecting key may be either a separately arranged key or a certain existing key.

In the various examples described herein, the first communication unit is, for example, a transceiver configured to be able to communicate with the controlled appliance, and its operating frequency band can be set according to an actual need. The first communication unit can be a communication module operating in a frequency band of 315MHz or 433MHz as described in the examples below, or it can be a wireless module having such functions as Bluetooth and NFC as long as it can communicate with controlled appliances. The second communication unit is a transceiver configured to be able to communicate with the external electronic device. For example, it can be a communication module operating in the frequency band of 2.4 GHz or under the protocol of 802.15.4 as described in the examples below, or it can be various communication modules that can communicate with the external electronic device in other frequency bands or under other protocols. Although the present invention mentions the first communication unit and the second communication unit, it is not excluded that the first communication unit and the second communication unit are configured as the same communication module. For example, both the first communication unit and the second communication unit can be configured as a Bluetooth module. In such case, the wearable control device controls the controlled appliance through the Bluetooth module and communicates with the external electronic device, such as the cell phone, through the Bluetooth module. However, if the wearable control device does not need to communicate with the external electronic device, then the second communication unit is unnecessary. For example, in the example mentioned previously, i.e. "user B first inputs his/her fingerprint through the biological information input unit 12, and if user A agrees to accept him/her as a registered user, then user A inputs his/her fingerprint of his/her right hand thumb through the biological information input unit 12 to indicate the approval," the administrating user does not need to send confirmation information through the external electronic device, and thus, the second communication unit can be omitted.

As an example, the wearable control device for controlling the controlled appliances according to the example of the present invention can control the smart home system of a HGW2000 system from Honeywell that is available from the market. In the case of controlling the HGW2000 system, the first communication unit of the wearable control device 1 is configured as the communication module operable in the frequency band of 315MHz or 433MHz, and the second communication unit is configured as the communication module operable in a Bluetooth mode or in various frequency bands or protocols that can enable the communication with the external electronic device, such as the frequency band of 2.4 GHz or the protocol of 802.15.4. Said wearable control device may include a scene selecting key and an arming/disarming key, and each of the keys can be reused. For example, a specific key can be pressed for two seconds to enter into a scene selecting mode and for five seconds to set the arming. Further, the wearable control device can interact with a remote controller (if any) of the HGW2000 system through the first communication unit.

As an example, said wearable control device 1 may also have other functions, such as step counting, sleep detection, time display, etc., just as those smart bracelets currently available in the market. However, this is not the focus of the present invention so it will not be elaborated herein.

The wearable control device for controlling the controlled appliances according to the present invention can facilitate the user wearing it to directly control various household appliances through the wearable control device without the need to find controllers. Moreover, the wearable control device according to the present invention can control the controlled appliances through the input of the biological information, such as the user fingerprint. Besides its convenience, the biological information, such as the user fingerprint, is registered only under permission of the administrator of the wearable control device, thus preventing an unauthorized user from controlling the smart home. Furthermore, the wearable control device interacts with the smart home through the first communication unit. For example, when an illegal intruding is carried out in a family or other environment where the smart home is disposed, the smart home system will send the response signal to the wearable control device, which will then alert the user by means of the vibration or the like, wherein alerting by means of the vibration is greatly advantageous for hearing-impaired users. In addition, in some emergent cases, e.g. being robbed and having the need to send the alarm, the user can directly operate a safety protection system of the smart home through the wearable control device to send the alarm, so as to call police in a faster and more undetectable way.

Figure 2:
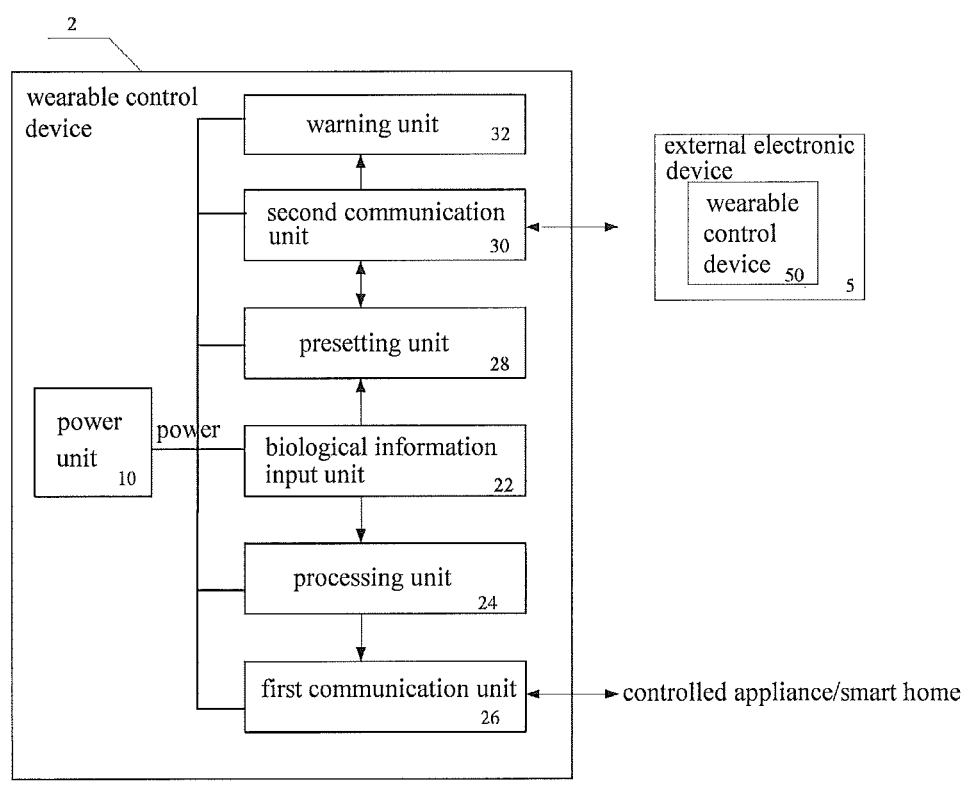
FIG. 2 is a schematic drawing of a structure of a control system for controlling a controlled appliance according to one embodiment of the present invention.

According to another aspect of the present invention, a control system for controlling a controlled appliance is provided. FIG. 2 is a schematic drawing of the control system. The control system comprises a wearable control device 2 and an external electronic device 5. The external electronic device 5 comprises a wearable device control unit 50. The wearable control device 2 comprises a power unit 20, a biological information input unit 22, a processing unit 24, a first communication unit 26, and a second communication unit 30. Alternatively, said wearable control device 2 further comprises a presetting unit 28. Alternatively, said wearable control device 2 further comprises a warning unit 32.

The power unit 20 supplies power to each of the units and components of the wearable control device 2. The biological information input unit 22, the processing unit 24, and the first communication unit 26 are basically the same as the biological information input unit 12, the processing unit 14, and the first communication unit 16 as shown in FIG. 1 so they will not be elaborated any more. The wearable control device 2 interacts with the external electronic device 5 through the second communication unit 30. When the wearable control device 2 is in a preset mode, it sends, through the second communication unit 30, a registration signal requesting registration of biological information input through the biological information input unit 22 to the wearable device control unit 50 and sets the biological information input through the biological information input unit 22 as registered biological information after obtaining a confirmation from the wearable device control unit 50.

According to one example of the present invention, the wearable control device 2 may further comprise the presetting unit 28. In the preset mode, if the biological information input through the biological information input unit 22 that requests registration has already obtained the confirmation from the wearable device control unit 50, then the presetting unit 28 can set a correspondence between said registered biological information and the control signal. Thus, in a non-preset mode, the processing unit 24 generates a control signal based on said biological information input through the biological information input unit 22 if the biological information input through the biological information input unit 22 is the registered biological information.

Alternatively, according to one example of the present invention, said wearable control device 2 may further comprise the warning unit 32 for issuing a warning signal when a response signal received from the controlled appliance is an alarm signal.

Similar to the descriptions given above with reference to FIG. 1, the external electronic device 5 is, for example, one or more of a cell phone, a tablet PC, and a laptop of an administrating user of the control system. In the example shown in FIG. 2, as for how a fingerprint is registered, how the administrating user responds to a registration request through the external electronic device based on the confirmation, how the preset mode is entered, and how the warning unit 32 is configured and operated, these are similar to the ways described above with reference to FIG. 1 so they are not elaborated any more.

According to still another aspect of the present invention, a method for controlling a controlled appliance is provided. The method is performed in a wearable electronic device that comprises a biological information input unit. There are different biological information input units because biological information adopted can differ. In this example, the biological information is a fingerprint. Accordingly, the biological information input unit is a fingerprint sensor.

The components of either the wearable control device as shown in FIG. 1 or the control system for controlling the controlled appliance as shown in FIG. 2 can be implemented by hardware, software, or a combination of hardware and software. In short, a power unit can be a rechargeable battery, a communication unit can be a transceiver or the like, a processing unit can be a microcontroller or other components that can realize a control function, and a warning unit can include a vibrator. If the present invention is to be implemented on an existing smart bracelet, then a biological information input unit and other necessary hardware, such as a processor, may be added to the existing smart bracelet. As an alternative, the biological information input unit may be added, and other units, such as the processing unit, may be implemented by configuring existing functions of the existing smart bracelet by means of software.

Figure 3:
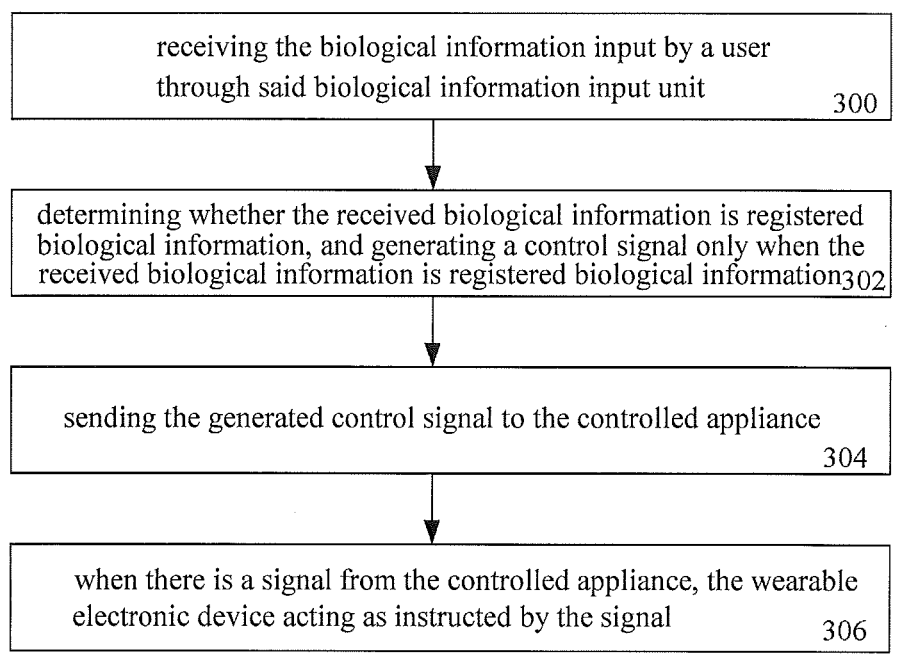
FIG. 3 is a flow chart of a method for controlling a controlled appliance according to one embodiment of the present invention.

FIG. 3 is a flow chart of the method for controlling the a controlled appliance according to an example of the present invention. In step 300, the biological information input by a user through the biological information input unit is received. For example, the wearable electronic device receives the fingerprint input by the user through the biological information input unit.

In step 302, the wearable electronic device determines whether the biological information received through the biological information input unit is registered biological information and generates a control signal based on said biological information received through the biological information input unit only when the biological information received through the biological information input unit is the registered biological information. As an example, the wearable electronic device first determines whether the fingerprint of the user input through the fingerprint sensor is a registered fingerprint. If yes, then it further generates the control signal according to the fingerprint of the user input through the fingerprint sensor. For instance, the wearable electronic device compares the fingerprint of the user input through the fingerprint sensor to the registered fingerprint and generates the control signal according to a correspondence between the registered fingerprint and the control signal.

In step 304, the wearable electronic device sends the control signal to the controlled appliance. When the method is applied in a situation where the controlled appliance is an part of a smart home system, the wearable electronic device can also send the control signal to a control center of the smart home system.

In step 306, when there is a response signal from the controlled appliance, the wearable electronic device may receive the response signal and process it accordingly, such as acting as instructed by said response signal. As an example, the controlled appliance can send an alarm signal to the wearable electronic device, and said wearable electronic device issues a warning signal in a form of a display, a vibration, a voice, or a combination thereof, for example.

According to an example of the present invention, the method shown in FIG. 3 further comprises setting the correspondence between the biological information input through the biological information input unit and the control signal when the wearable electronic device is in a preset mode. Thus, generation of the control signal in step 302 is based on the correspondence.

For example, in the preset mode, the user that requests registration first inputs his/her fingerprint through the biological information input unit. If an administrating user agrees to accept him/her as a registered user, then the administrating user inputs his/her fingerprint of his/her own right hand thumb through the biological information input unit to indicate approval. Alternatively, the wearable electronic device can communicate with an external electronic device, including a wearable device control unit. Specifically, the wearable electronic device sends a registration signal requesting to convert an input fingerprint into a registered fingerprint to the external electronic device. If the administrating user agrees to accept said input fingerprint as the registered fingerprint, then confirmation information is generated through the wearable device control unit of the external electronic device and is sent to the wearable electronic device, and the wearable electronic device accordingly sets the input fingerprint as the fingerprint information and sets the correspondence between the input fingerprint and the control signal.

The method shown in FIG. 3 can be carried out in the wearable control device as shown in FIG. 1. The method shown in FIG. 3 can be implemented in various smart bracelets currently available in the market as long as the biological information input unit is added thereto. Even if no biological information input unit is added to the various smart bracelets currently available in the market, as long as they can communicate with a peripheral biological information input unit so as to be used in cooperation with the peripheral biological information input unit, then the method shown in FIG. 3 can still be implemented therein.

By carrying out the flow chart of the method for controlling the controlled appliance according to the present invention, the wearable electronic device can be implemented as a wearable control device that can control a smart home, thus facilitating the user wearing it to directly control various household appliances of the smart home through the wearable control device without a need to find controllers. Moreover, control of the various household appliances can be realized through the input of the biological information, such as the fingerprint, so besides convenience, the control of the smart home by an unauthorized user is prevented. Furthermore, the wearable control device interacts with the smart home through a first communication unit. When an illegal intruding is carried out in a family or other environment where the smart home is disposed, the smart home system will send the response signal to the wearable control device, which will then alert the user by means of the vibration or the like. Alerting by means of the vibration is greatly advantageous for hearing-impaired users. In addition, in some emergent cases, e.g. being robbed and having the need to send an alarm, the user can directly operate a safety protection system of the smart home through the wearable control device to call police in a faster and more undetectable way.

Although the specific embodiments of the present invention have been disclosed in the above text with reference to the drawings, those skilled in the art shall understand that the disclosed specific embodiments can be changed or modified without departing from the spirit of the present invention. The embodiments of the present invention are only for illustrating, but not for limiting the invention. For example, as for a smart bracelet available in the market, a biological information input unit can be added thereto, and a communication interface of the smart bracelet can be configured, e.g. configuring a first communication interface thereto so that the smart bracelet can communicate with appliances of the smart home.

What is claimed is:

1. A wearable control device for controlling a plurality of controlled appliances comprising:
    a biological information input unit for receiving first biological information;
    a processing unit for determining whether the first biological information matches registered biological information corresponding to one of the plurality of controlled appliances and, when the first biological information matches the registered biological information corresponding to the one of the plurality of controlled appliances, generating a control signal for the one of the plurality of controlled appliances based on the first biological information and a current state of the one of the plurality of controlled appliances; and
    a first communication unit for communicating the control signal to the one of the plurality of controlled appliances and receiving a response signal from the one of the plurality of controlled appliances.

2. The wearable control device according to claim 1, further comprising a presetting unit coupled to the biological information input unit and the processing unit for assigning second biological information received from the biological information input unit as the registered biological information and setting a correspondence between the registered biological information and the one of the plurality of controlled appliances when the wearable control device is in a preset mode.

3. The wearable control device according to claim 2, further comprising:
    a second communication unit for enabling communication between the wearable control device and an external electronic device,
    wherein the external electronic device includes a wearable device control unit, and
    wherein, when in the preset mode, the presetting unit sends a registration signal to the wearable device control unit through the second communication unit requesting registration of the second biological information and, after obtaining a confirmation from the wearable device control unit, assigns the second biological information as the registered biological information.

4. The wearable control device according to claim 3, wherein the external electronic device is one or more of a cell phone, a tablet PC, a laptop, and a desktop computer.

5. The wearable control device according to claim 1, further comprising a warning unit for issuing a warning signal when the response signal from the one of the plurality of controlled appliances includes an alarm signal.

6. The wearable control device according to claim 1, wherein the first biological information includes a fingerprint.

7. A control system for controlling a plurality of controlled appliances comprising:
    a wearable control device;
    a biological information input unit of the wearable control device for receiving first biological information;
    a processing unit of the wearable control device for determining whether the first biological information matches registered biological information corresponding to one of the plurality of controlled appliances and, when the first biological information matches the registered biological information corresponding to the one of the plurality of controlled appliances, generating a control signal for the one of the plurality of controlled appliances based on the first biological information and a current state of the one of the plurality of controlled appliances;
    a first communication unit of the wearable control device for communicating the control signal to the one of the plurality of controlled appliances and receiving a response signal from the one of the plurality of controlled appliances;
    a second communication unit of the wearable control device; and
    an electronic device including a wearable device control unit that communicates with the wearable control device through the second communication unit,
    wherein, when the wearable control device is in a preset mode, the wearable control device sends a registration signal to the wearable device control unit through the second communication unit requesting registration of second biological information received through the biological information input unit and assigns the second biological information as the registered biological information after obtaining a confirmation from the wearable device control unit.

8. The control system for controlling the plurality of controlled appliances according to claim 7, wherein the wearable control device includes a presetting unit that, when the wearable control device is in the preset mode, sets a correspondence between the registered biological information and the one of the plurality of controlled appliances.

9. The control system for controlling the plurality of controlled appliances according to claim 7, wherein the electronic device is one or more of a cell phone, a tablet PC, a laptop, and a desktop computer.

10. The control system for controlling the plurality of controlled appliances according to claim 7, wherein the wearable control device includes a warning unit for issuing a warning signal when the response signal from the one of the plurality of controlled appliances includes an alarm signal.

11. The control system for controlling the plurality of controlled appliances according to claim 7, wherein the first biological information includes a fingerprint.

12. A method for controlling a plurality of controlled appliances comprising:
    a biological information unit of a wearable electronic device receiving first biological information;
    determining whether the first biological information matches registered biological information corresponding to one of the plurality of controlled appliances;

when the first biological information matches the registered biological information corresponding to the one of the plurality of controlled appliances, generating a control signal for the one of the plurality of controlled appliances based on the first biological information and a current state of the one of the plurality of controlled appliances;

communicating the control signal to the one of the plurality of controlled appliances; and the wearable electronic device receiving and processing a response signal from the one of the plurality of controlled appliances.

13. The method for controlling the plurality of controlled appliances according to claim 12, further comprising: setting a correspondence between the registered biological information and the one of the plurality of controlled appliances when the wearable electronic device is in a preset mode.

14. The method for controlling the plurality of controlled appliances according to claim 13, further comprising:

when in the preset mode, sending a registration signal to an external electronic device requesting registration of second biological information; and the external electronic device assigning the second biological information as the registered biological information.

15. The method for controlling the plurality of controlled appliances according to claim 14, wherein the external electronic device is one or more of a cell phone, a tablet PC, a laptop, and a desktop computer.

16. The method for controlling the plurality of controlled appliances according to claim 12, further comprising the wearable electronic device issuing a warning signal when the response signal from the one of the plurality of controlled appliances includes an alarm signal.

17. The method for controlling the plurality of controlled appliances according to claim 12, wherein the first biological information includes a fingerprint.

* * * * *